Jan. 15, 1957   B. MLÀDEK   2,777,403
CONTINUOUSLY OPERATING STUFFING AND DIVIDING
MACHINE FOR DOUGHLIKE MATERIAL
Filed July 28, 1953
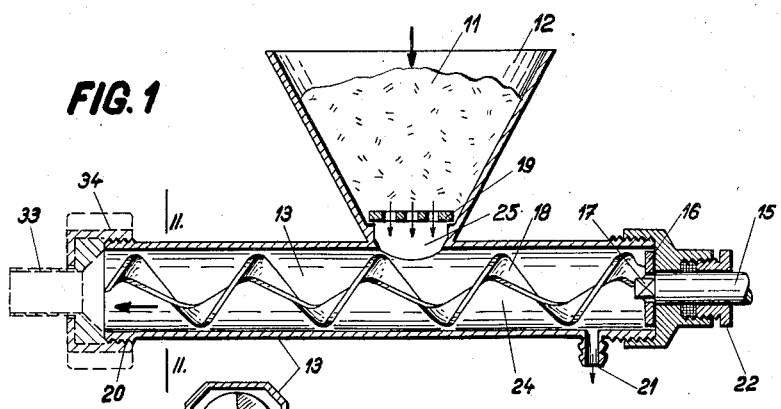
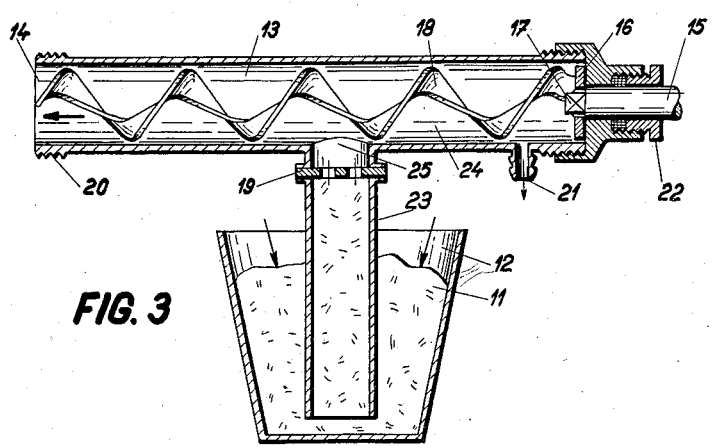
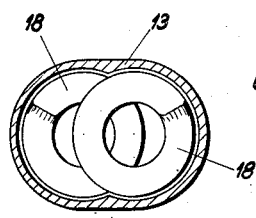
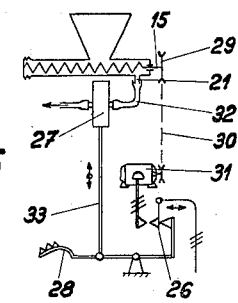
INVENTOR.
Bedřich Mládek
BY Richard ...

United States Patent Office 2,777,403
Patented Jan. 15, 1957

2,777,403

CONTINUOUSLY OPERATING STUFFING AND DIVIDING MACHINE FOR DOUGHLIKE MATERIAL

Bedřich Mládek, Prague, Czechoslovakia, assignor to Vyvoj Praha, Narodni podnik, Prague, Czechoslovakia, a corporation of Czechoslovakia Application July 28, 1953, Serial No. 370,852

Claims priority, application Czechoslovakia August 1, 1952

2 Claims. (Cl. 107—14)

The present invention relates to a continuously operating stuffing and dividing machine for doughlike material.

Machines of this kind heretofore used for stuffing and dividing doughlike material, such as minced meat in the production of sausages, or in the production of fine pastry or the like, comprise a cylinder for the material to be treated, the latter being extruded by the pressure of a piston. This arrangement has grave drawbacks in use. In the first place objectionable air or gas bubbles trapped in the material are not removed, the temperature of the mass is raised owing to its compression in the cylinder and the operation of the machine is intermittent. A further important drawback of these machines is their robust, sturdy and complex construction and danger to the operator.

It is an object of this invention to provide a stuffing and dividing machine which removes bubbles of air or gas enclosed in the treated mass, so as to increase the sterility of the meat or other treated material.

A further object of the invention is to provide a machine of the kind disclosed wherein portions of the material stuffed into cases or skins or divided in any other way have all equal weight.

It is a further object of the invention to provide a stuffing and dividing machine ensuring continuous operation at a uniform rate while reducing to the minimum the possibility of the operative portions of the machine becoming clogged or otherwise put out of action.

In accordance with the present invention the continuously operating stuffing and dividing machine comprises at least one rotating transport screw for the material to be treated, said screw as well as its casing being extended beyond the point of entry of the material in a direction opposite to the direction of operation of the transport screw, a suction orifice being provided in the rear part of the said extension of the casing, said suction orifice being operatively connected with a source of vacuum.

These and other objects and features of the present invention will be fully set forth in the following description, made in connection with the accompanying drawing in which like reference characters refer to similar parts throughout the several views and in which:

Fig. 1 is a central vertical section through the main part of the machine,

Fig. 2 is a view in transverse section on the line II—II of Fig. 1,

Fig. 3 is a section similar to that of Fig. 1 of a modified embodiment of the invention, Fig. 4 is a sectional view, similar to Fig. 2 of another embodiment of the invention and Fig. 5 shows diagrammatically the general layout of the machine.

Referring now to Figs. 1 and 2 of the drawing, the machine comprises a casing 13 with a transport screw 18 mounted for rotation therein. In the example shown the screw 18 is rigidly connected at its rear end with a disc 16 provided with a rectangular aperture, engaged by a square head 17 of a shaft 15; the latter is operatively connected with suitable driving means. As shown by way of example in Fig. 5 a wheel or pulley 29 is mounted on the shaft 15 and driven by means of a chain or belt 30 from an electromotor 31. The shaft 15 is sealed in the casing by a seal 22.

A hopper 12 is provided on the casing 13 between its ends in such a way that the casing 13 as well as the screw 18 extends rearwards for a considerable distance beyond the point 25 where the hopper 12 opens into the casing 13, and forms thus a rear extension 24. In the bottom portion of the hopper 12 a reduction grid 19 is mounted; its purpose will be described later. The casing 13 may have any suitable cross sectional shape preferably that of a polygon, as shown in Fig. 2, or may be provided at its inner surface with ribs, grooves, helices or the like in order to prevent the doughlike material transported by the screw from rotation therewith.

The extension 24 of the casing 13 carries in its rear part a suction nipple 21 adapted to be connected to a vacuum pump (not shown) by means of a conduit 32 (Fig. 5). A valve 27 is interposed in the conduit 32.

The machine may be put in and out of operation in any desired way, for instance, as shown in Fig. 5, by a foot lever or treadle 28, actuating a contact 26 which closes or opens the circuit of the motor 31 respectively.

The foot lever 28 is also connected with the valve 27 by means of a link 33, the arrangement being such that when the foot lever 28 is depressed the valve is opened, allowing the vacuum pump to exhaust air from the casing 13, whereas when the foot lever 28 is released the valve 27 closes the conduit 32.

The machine described above operates as follows:

The material 11 to be treated is introduced into the hopper 12. By depressing the foot lever 28 the motor 31 is started and the transport screw 18 set in movement. At the same time the valve 27 is opened and the interior of the casing 13 connected with the vacuum pump which produces vacuum in the interior of the casing 13. At the beginning of operation the front end 14 of the casing has to be closed by a suitable plug or the like closure.

By the influence of the vacuum in the casing 13 the doughlike material is sucked in through the reduction grid 19 and aperture 25 into the casing 13 where it is engaged by the screw and transported towards the front end 14.

The reduction grid 19 prevents a surplus of the material 11 from entering into the casing 13 and the screw may thus continuously transport the material 11 at the correct rate towards the front end 14. The part of the screw 18 extending rearwardly beyond the aperture 25 serves to return to the fore any material which may have penetrated into the rear extension 24 by the influence of suction produced by the vacuum pump. Any penetration of material towards the suction nipple or orifice 21 and clogging thereof are positively prevented.

The suction nipple 21 must be arranged in such a distance from the aperture 25 for admission of material, that the length of the screw 18 between these two points is sufficient to prevent the material from penetrating to the nipple 21.

The reduction grid 19 is mounted in the hopper 12 for easy withdrawal and interchange and is provided with apertures of a size to suit any particular conditions of operation.

As stated above, the drive of the screw 18 is operatively connected to the valve 27 so that when the foot lever is released and the screw 18 brought to a standstill, the valve 27 is closed and the suction in the interior of the casing 13 interrupted. In this way clogging of the suction nipple 21 during a standstill of the screw 18 is prevented.

It will be obvious to anybody skilled in the art that the operative connection between the drive of the machine and the valve 27 or the vacuum pump maybe carried out in various ways. So for instance the valve may be controlled by means of an electromagnet energized upon actuation of the motor switch or the valve may be controlled by means of centrifugal governor mounted on the shaft 15, in which case the valve 27 will be closed when the number of revolutions of the screw 18 falls below a certain limit, or in any other way.

During intervals in operation the mass 11 and the length of the screw 18 between the front end 14 and aperture 25 provide an efficient seal against penetration of atmospheric air into the casing 13. The latter, as well as the screw 18 must, of course, have a length sufficient for this purpose.

Fig. 3 illustrates a modified embodiment of the invention. Instead of the hopper a suction tube 23 is attached to the aperture 25. The suction tube 23 is submerged into a container 12 into which the material 11 is introduced, the latter being sucked in into the casing 13 through the reduction grid 19 by the vacuum produced.

The details of the machine may be varied in order to suit particular requirements. So for instance it may be advantageous to use two parallel transport screws instead of a single screw 18. Such an arrangement is shown in a cross sectional view in Fig. 4, wherein two intermeshing transport screws 18, 18', are used. One of the screws has a right hand pitch, the other a left hand pitch, the screws rotating in opposite directions. The inner surface of the casing 13 may in this case be smooth and follow in the form of two partial cylindrical surfaces closely the outline of the helices. The two screws operate as transport means and at the same time as mixing members. This arrangement ensures a thorough mixing and kneading of the material.

The removal of air from the interior of the casing 13 during operation of the machine is important from two aspects: In the first place a uniform entry of the material 11 into the casing 13 is achieved and furthermore the highly objectionable bubbles of air or gas which have penetrated into the material 11 are positively removed. The removal of air enhances the sterility of meat or other material.

The removal of air from the material 11 is of major importance when the material has to be divided into equal portions as is the case in the production of sausages or pastry, because the portions of material which have the same length have then also the same weight.

The machine according to the invention can therefore preferably be used as a machine for extruding and dividing dough in the production of pastry or the like, since any unequality in the specific mass caused by different degrees of fermentation is positively removed by sucking off air or carbon dioxide.

In this case a reduction mouthpiece 33 is fitted to the front end 14 of the casing 13, for instance by a sleeve 34 screwed on the threaded portion 20, said reduction mouthpiece 33 having an aperture of a profile corresponding to the desired cross-sectional form of products to be extruded.

A cutting device, known per se, cuts pieces of equal weight. The machine according to the invention may therefore be used as an extruding, dividing and at the same time shaping machine for fine pastry.

It will, of course, be understood that various changes may be made in the form, details, arrangement and proportions of the parts, without departing from the scope of my invention, which generally stated, consists in a device capable of carrying out the objects above set forth, in the parts and combinations of parts disclosed and defined in the appended claims.

What I claim is:

1. A continuously operating stuffing and dividing machine for dough-like material comprising an elongated cylindrical casing having an unobstructed interior from end to end thereof, a conveyor screw rotatably mounted in said casing and extending along the entire length of the latter, said casing having an entry hopper opening directly into said casing in a radial direction intermediate the ends of the casing for the introduction of the material into said casing, means for rotating said screw to propel material introduced into said casing toward one end of the latter, a suction orifice opening into said casing at a location spaced from said entry hopper in the direction toward the other end of said casing, and means for applying a suction to said orifice, the action of said screw on the material to propel the latter toward said one end of the casing being greater than the action resulting from the suction applied to said orifice and tending to draw the material from said entry toward said orifice thereby to prevent clogging of the latter by the material.

2. A machine according to claim 1; wherein said means for rotating the screw includes an electric motor operatively connected to said screw and first means for controlling the operation of said motor, and said means for applying a suction to the orifice includes a source of suction, a conduit between said source and orifice and second means for controlling the communication of said orifice with said source through said conduit; and further comprising means interconnecting said first and second controlling means so that said orifice communicates with said source and is cut-off from the latter when said motor is operative and inoperative, respectively.

References Cited in the file of this patent

UNITED STATES PATENTS

| 155,602 | Wiegand | Oct. 6, 1874 |
| 1,283,947 | Steinle | Nov. 5, 1918 |
| 2,078,565 | Durst et al. | Apr. 27, 1937 |
| 2,556,391 | Hawk | June 12, 1951 |

FOREIGN PATENTS

| 568,094 | Great Britain | Mar. 19, 1945 |